Patented May 20, 1952

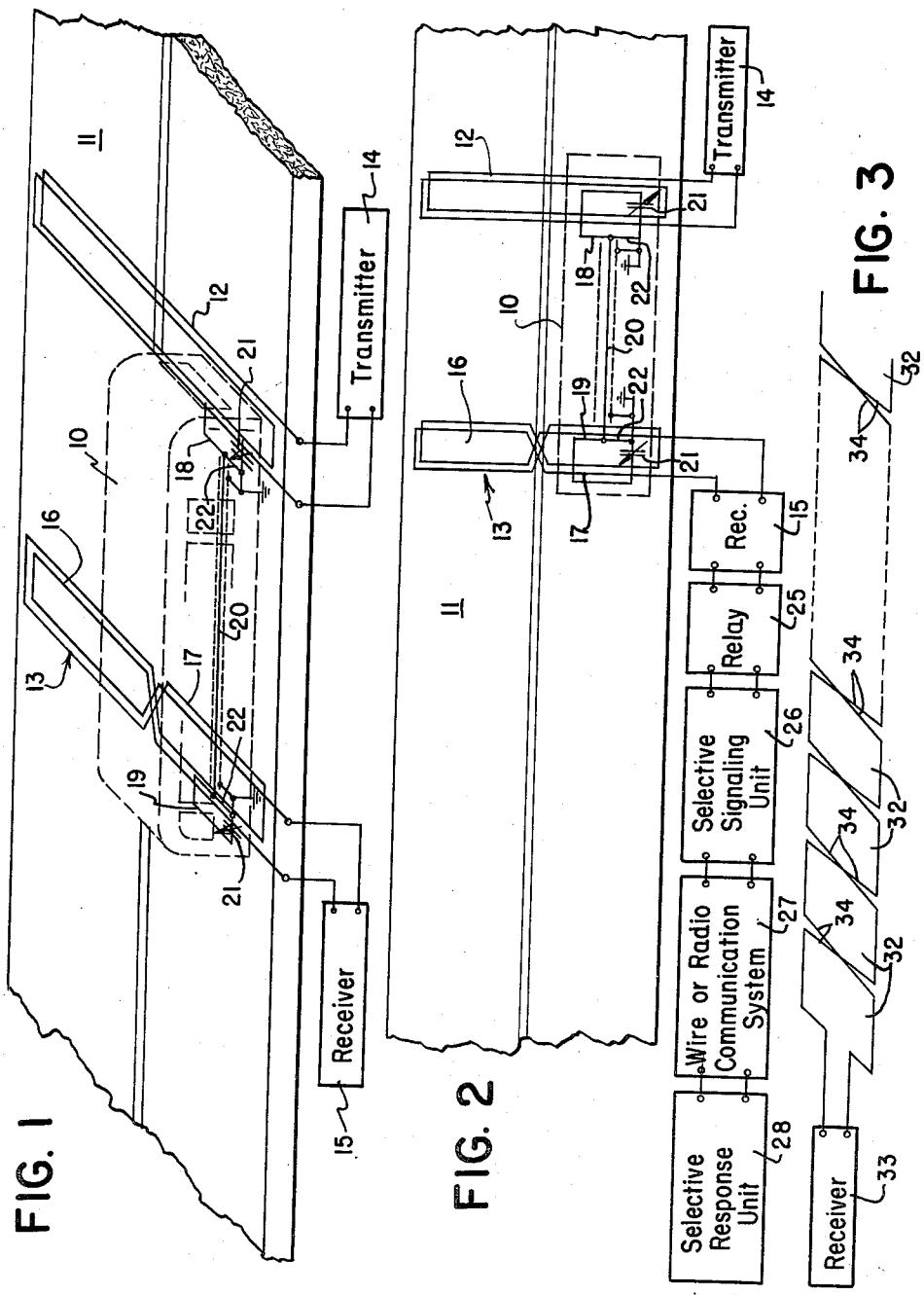

2,597,518

UNITED STATES PATENT OFFICE 2,597,518

VEHICLE DETECTING SYSTEM

William J. Parks, Chicago, Ill., assignor to Motorola, Inc., Chicago, Ill., a corporation of Illinois Application October 17, 1949, Serial No. 121,719

6 Claims. (Cl. 177—353)

This invention relates generally to systems for identifying moving objects, and more particularly to a system for indicating the progress of a bus or other vehicle over a predetermined course.

Many public transportation companies have need for a system whereby a central office is kept informed as to the positions of buses or other vehicles which are being operated over a course or a plurality of courses. This information facilitates the preparation of time schedules and other useful data concerning the positions and the progress of the vehicles operated by a transportation company. A system of this character is disclosed in the copending application of Daniel E. Noble, Serial No. 31,269, filed June 5, 1948. Information is provided by a plurality of stations positioned at intervals along a roadway over which buses travel. At each of these stations, transmitting and receiving antennas extend across the roadway. Normally these antennas are very loosely coupled to each other, but when a bus equipped with a suitable coupling means arrives at a station, the transmitting and receiving antennas are linked together through the coupling means carried by the bus, and a distinctive signal is sent to the central office indicating the station at which the bus has arrived. The coupling between the antennas is reduced to its normal value when the bus leaves the station, thereby interrupting the station signal.

One of the problems which arises in the design of a bus progress system is the amount of undesired stray coupling that may exist between the transmitting and receiving antennas at some stations. Ordinary loop antennas cannot be sufficiently isolated from one another to completely eliminate this stray coupling under all practical operating conditions. Hence, under some circumstances, the arrival of a vehicle at a particular station may be indicated merely by a change in the strength of the signal picked up by the receiver, rather than by the presence or total absence of such a signal. Complete interruption of the received signal in the absence of a vehicle would be more desirable, as it would cause a more definite response by the system when a vehicle arrives at the station. There is also a tendency for the receiving loop to pick up ignition noises from vehicles passing over it, and this, too, may cause trouble at the central office.

An object of the present invention is to provide an improved system for indicating the progress of movable objects over a predetermined course, which system is free of the disadvantages mentioned above.

Another object is to provide a system of this character in which stray signals picked up by the receiving antenna are effectively canceled within the antenna itself.

A further object is to provide more definite and reliable information to the central office under all conditions of operation.

A feature of the invention is the provision of a receiver loop antenna having relatively transposed portions therein for causing the stray signals to be canceled out.

Another feature is the provision of a receiver loop antenna having multiple transpositions therein to prevent the sending of spurious signals which otherwise might be produced as a result of stray pickup from the transmitting antenna, or from the ignition systems of vehicles passing over the receiving antenna, or due to the shielding effect of a vehicle passing over a portion of the receiving antenna.

The foregoing and other objects and features of the invention will be better understood from a study of the following description taken in connection with the accompanying drawings, wherein:

Fig. 1 is a perspective view illustrating a system embodying the invention;

Fig. 2 is a simplified plan view of the system; and

Fig. 3 is a plan view of a modification.

In practicing the invention there is provided a system for indicating the progress of moving vehicles such as buses or streetcars over a course such as the usual bus or streetcar route. A plurality of stations may be provided along the route, each including a transmitter and a receiver respectively having antennas positioned across the roadway traversed by the vehicles. A coupling means is carried by each vehicle for linking the transmitting and receiving antennas when the vehicle passes by each station. When the transmitting and receiving antennas are closely coupled together through the medium of the coupling means in the vehicle, the receiver then operates a suitable signalling means for sending a station signal to the central office. In carrying out the objectives of the invention, the receiving antenna has two or more transposed loop portions therein for canceling out the stray pickup from the transmitting antenna. Voltages induced in the receiving antenna by stray pickup from the transmitting antenna oppose one another in these transposed portions. The coupling means which is carried by a vehicle, however, couples the transmitting antenna to only one of the transposed loop portions in the receiving antenna; hence at the receiving antenna there is no balancing pickup to cancel the pickup effected through the vehicle. For eliminating the objectionable pickup of ignition noises from vehicles, as well as any net pickup of stray signals from the transmitting antenna due to the partial shielding of the receiving antenna by a vehicle passing thereover, the receiving antenna may be constructed with a large number of transpositions. In this arrangement, all of the small transposed loops in the receiving antenna which pick up noise or a stray signal will cancel each other to the nearest even number, leaving at most the net effect of only one small loop, which is not appreciable.

Referring now to the drawings, in Figs. 1 and 2 there is illustrated an identifying station with a bus 10 shown in broken outline. The bus 10 is on the roadway 11 in which transmitting and receiving loop antennas 12 and 13 are embedded. These loops 12 and 13 are insulated from ground to minimize the direct coupling between them. The antenna 12 is fed by a transmitter 14, and the antenna 13 feeds its output to a receiver 15. The transmitter 14 operates continuously to provide a signal which is radiated by the loop antenna 12. The loop 13 is separated from the loop 12 by a distance approximately equal to the length of the vehicle 10, and under ideal conditions this spacing would be sufficient to prevent the direct pickup of the transmitted signal by the antenna 13 when no vehicle is present at that station.

Under practical operating conditions an undesirable amount of stray coupling may exist between the antennas 12 and 13. To nullify the effect of this stray coupling, the receiving antenna is so arranged as to define transposed loop portions therein. The embodiment illustrated in Figs. 1 and 2 has two transposed loops 16 and 17 in the antenna 13. This causes the direct energy transfer between the antennas 12 and 13 to be canceled out insofar as any effect upon the receiver 15 is concerned. Hence, in the absence of a vehicle 10 at the station, the net pickup by the receiving antenna is substantially zero.

The bus 10 carries at the opposite ends thereof a pair of loops 18 and 19, which are spaced substantially the same distance as the loops 12 and 13. The loops 18 and 19 are closed loops and are coupled together by a coaxial line 20 extending longitudinally of the vehicle 10. Each of these loops has a condenser 21 for tuning the same. The coaxial line 20 is connected across a small portion 22 of each loop, thereby affording a low-impedance coupling. When the loops 18 and 19 are tuned, they provide far greater coupling between the transmitting and receiving antennas 12 and 13 than would exist with any accidental coupling by buses or vehicles not carrying these coupling loops. The coupling means including the loops 18 and 19 is effectively coupled to either the loop portion 16 or the loop portion 17 of the receiving antenna 13, depending upon the side of the street 11 that the bus 10 is travelling upon. In the present instance it is assumed that the loop 18 picks up signals radiated by the antenna 12 and that the loop 19 reradiates these signals to the loop portion 17 of the antenna 13. Hence, a strong signal is induced in the loop portion 17 as the transmitter loop 12 is coupled thereto through the medium of the loop 18, line 20 and loop 19. Inasmuch as this strong signal is not balanced by any signal induced in the loop portion 16, there is a strong net voltage which is impressed upon the input side of the receiver 15.

Fig. 2 indicates the manner in which the station-indicating signal is transmitted to the central office. A relay 25 operates whenever a signal of predetermined magnitude is passed by the receiver 15, causing a selective signalling unit 26 to operate. The selective signalling unit 26 may be any unit which provides a signal having distinctive characteristics that identify the particular station in question, such signalling units being well known in the art. The signal then is transmitted through a wire or communication system 27 (which may serve as a common channel for transmitting identification signals from a number of stations) to a selective response unit 28 located at the central office. There may be many of these selective response units, each responding to signals coming from a particular station in the system. As each selective response unit 28 is operated, it gives an indication to the central station operator or recorder that a bus is passing a particular station. If desired, the system can also be designed so that each signal received by the central office indicates not only the identity of a station but also the identity of the particular bus at that station.

The receiving antenna 13 in Figs. 1 and 2 has the advantage that it prevents any stray coupling which may exist between the transmitting and receiving antennas 12 and 13 from having any effect upon the receiver 15 under most circumstances. However, each time that a vehicle passes over one of the loop portions 16 or 17 of this antenna, there is a partial shielding of the loop portion which tends to unbalance the voltages induced in the portions 16 and 17 by stray pickup. This may produce a net induced voltage that would affect the receiver 15 and the relay 25. The relay 25 can, of course, be adjusted so that it responds only to signals at a certain level. Thus, ordinary vehicles not equipped with the two coupling loops 18 and 19 will not operate the selective signalling unit 26. An effective solution of this problem, however, is the utilization of a multiple loop antenna as shown in Fig. 3, which will be explained presently.

Another possible source of trouble is the pickup of ignition noises by either loop portion 16 or 17 from vehicles passing above them. As a general rule these noises would not be canceled out in the antenna 13.

To make the system less subject to improper operation under the foregoing conditions, a receiving loop antenna with multiple transpositions, such as the antenna 30 in Fig. 3, may advantageously be employed. The antenna 30 contains a large number of very small coupling loops 32, for example, twenty-four. Each loop 32 is just large enough for being affectively coupled to a loop such as 19, Fig. 2, carried by a vehicle 10. As in the previous case, a strong voltage is induced in the receiving antenna 30 when such coupling exists, and this voltage is impressed upon the receiver 33. If a vehicle such as an ordinary automobile passes over the antenna 30 and shields several of the loops 32, the remaining loops 32 may pick up stray signals from the transmitting antenna 12 (Fig. 1). The voltages induced in the various loops 32 by stray pickup, however, will cancel each other to the largest even number. Thus, for example, if four of the small loops 32 were shielded and twenty left unshielded, the pickup in ten of the unshielded loops would then exactly cancel the pickup in the other ten unshielded loops. If the number of unshielded loops were, say, nineteen, then the pickup in nine of these loops would cancel the pickup in nine other loops, leaving a balance of only one loop 32 which would be effective in supplying a signal to the receiver 33. The voltage which is induced in any one loop 32 by stray pickup is so small that it does not affect the relay 26 (Fig. 2); consequently it does not result in the transmission of a station signal to the central office. The same considerations apply to ignition noises. If the number of loops affected is an even number, the noise pickup is exactly canceled. Otherwise, if an odd number of loops is affected, there will be the net pickup of only one loop 32, which again is too small to cause faulty operation of the system.

Thus it will be seen that the multiple transpositions in the loop 30, Fig. 3, serve to prevent the sending of spurious signals which otherwise might be caused by the shielding effect of vehicles or by the pickup of ignition noises. Preferably, the cross wires 34 of the loops 32 are disposed at 45-degree angles with respect to the longitudinal axis of the antenna. This eliminates the possibility of a vehicle 10 equipped with the pickup loops 18 and 19 failing to produce a station signal by passing over a dead spot in the transposition, assuming of course that the vehicle itself is not traveling at approximately a 45-degree angle relative to the antenna.

While the invention has been described with reference to several preferred embodiments thereof, such embodiments are subject to modification within the spirit and scope of the invention as expressed in the appended claims.

I claim:

1. In a system for detecting the presence of a movable object at a particular location, a wave signal radiator at said location, a receiving antenna at said location spaced from said radiator, said antenna comprising a plurality of series-connected conductive loop portions which are electrically opposed to each other as regards the direct pickup of signals from the radiator, so that the signals picked up by said antenna directly from said radiator are substantially cancelled out, and coupling means carried by a movable object including a pair of coupling loops for respectively picking up signals from said radiator and for reradiating the picked-up signals to one of the loop portions in said receiving antenna when said object is at said location, said coupling loops having the same spacing as said wave signal radiator and said receiving antenna, with said one loop receiving a strong signal from said coupling means thereby providing a net voltage of substantial magnitude in said receiving antenna.

2. In a system for detecting the presence of a movable object at a particular location, a wave signal radiator at said location, a receiving antenna at said location spaced from said radiator, said antenna comprising a continuous conductor having a plurality of transposed loop portions therein defined by crossed parts of said conductor, said loop portions being electrically opposed to each other as regards the direct pickup of signals from the radiator, thereby signals picked up by said antenna directly from said radiator are substantially cancelled out, and coupling means carried by a movable object including a pair of coupling loop means for respectively picking up signals from said radiator and for reradiating the picked-up signals to one of the loop portions in said receiving antenna, said coupling loop means being spaced to correspond to the spacing of said wave signal radiator and said receiving antenna, with said one loop portion receiving a relatively strong signal from said coupling means thereby providing a net voltage of substantial magnitude in said receiving antenna.

3. A wave signal system for detecting the presence of a vehicle at a particular location comprising a wave signal radiator at said location, a receiving antenna at said location spaced from said radiator, said receiving antenna comprising a plurality of series-connected conductive loop portions which are electrically opposed to each other as regards the direct pickup of signals from the radiator, thereby to provide substantially no net voltage in said receiving antenna from reception of signals directly from said radiator, and coupling means carried by a vehicle including a pair of coupling loops for respectively picking up signals from said radiator and for reradiating the picked-up signals to said receiving antenna when said vehicle is at said location, said coupling loops having the same spacing as said wave signal radiator and said receiving antenna, said reradiating loop of said coupling means having dimensions such as to be coupled effectively to only one of the loop portions in said antenna, with said one loop portion being responsive to signals reradiated by said coupling means for inducing a net voltage of substantial magnitude in said receiving antenna.

4. A wave signal system for detecting the presence of a vehicle at a particular location comprising a wave signal radiator at said location, a receiving antenna at said location spaced from said radiator, said receiving antenna comprising a plurality of series-connected loops which are electrically opposed to each other as regards the direct pickup of signals from the radiator, said loops being of such small size that the pickup of stray signals thereby and the shielding thereof by adjacent objects is substantially cancelled out and has negligible effect, and coupling means carried by a vehicle including a pair of coupling loop means for respectively picking up signals from said radiator and for reradiating the picked-up signals to said receiving antenna when said vehicle is at said location, said coupling loop means being spaced to correspond to the spacing between said wave signal radiator and said receiving antenna, with said reradiating loop means and each of said loops having dimensions such that said reradiating loop means is coupled effectively to only one loop at a time so that a net voltage of substantial magnitude is produced in said receiving antenna when said vehicle is at said location.

5. A system for detecting the presence of a movable object at a particular location including in combination, a signal radiating antenna at said location, a receiving antenna at said location spaced from said radiating antenna, one of said antennas comprising a plurality of series-connected conducting loop portions which are electrically opposed to each other with respect to direct transmission of signals between said antennas, so that there is no substantial net voltage induced in said receiving antenna by direct transmission from said radiating antenna, and coupling means carried by a movable object including a pair of coupling loop means for respectively picking up signals from said radiating antenna and for reradiating the signals picked up adjacent said receiving antenna when said object is at said location, said coupling loop means being spaced to correspond to the spacing between said signal radiating antenna and said receiving antenna, to thereby provide efficient coupling between one loop portion of said one antenna and said other antenna so that a net voltage of substantial magnitude is produced in said receiving antenna when said object is at said location.

6. A system for detecting the presence of a movable object at a particular location including, in combination, transmitting means including a signal radiating antenna at said location, receiving means including a receiving antenna at said location spaced from said radiating antenna, one of said antennas comprising a plurality of series-connected conducting loop portions which are electrically opposed to each other with respect to direct transmission of signals between said antennas, so that the net voltage induced in said receiving antenna by direct transmission from said radiating antenna is held below a predetermined value, and coupling means carried by a movable object including a pair of coupling loop means for respectively picking up signals from said radiating antenna and for reradiating the signals picked up adjacent said receiving antenna when said object is at said location, said coupling loop means being spaced to correspond to the spacing between said signal radiating antenna and said receiving antenna to thereby provide efficient coupling between one loop portion of said one antenna and said other antenna, so that a net voltage greater than said predetermined value is produced in said receiving antenna when said object is at said location, said receiving means including selective means responding to a voltage greater than said predetermined value.

WILLIAM J. PARKS.

REFERENCES CITED

The following references are of record in the file of this patent:

UNITED STATES PATENTS

| Number | Name | Date |
| --- | --- | --- |
| 1,747,008 | Jacobson | Aug. 19, 1920 |
| 2,455,376 | Lindsay | Dec. 7, 1948 |
| 2,488,815 | Hailes | Nov. 22, 1949 |

FOREIGN PATENTS

| Number | Country | Date |
| --- | --- | --- |
| 149,532 | Great Britain | Aug. 19, 1920 |